Aug. 13, 1946.  S. C. HURLEY, JR  2,405,829
SORTING CHUTE
Filed Sept. 18, 1944

INVENTOR.
SAMUEL C. HURLEY, JR.
BY Benedict & Swartwood
ATTORNEYS

Patented Aug. 13, 1946

2,405,829

UNITED STATES PATENT OFFICE 2,405,829

SORTING CHUTE

Samuel C. Hurley, Jr., Danville, Ill.

Application September 18, 1944, Serial No. 554,581

2 Claims. (Cl. 209—74)

This invention relates to an inclined sorting chute having a lower port through which articles are discharged from the chute by gravity and an upper port through which articles are discharged by a positive actuation means.

Among the objects and embodiments of my invention, I provide a sorting chute whereby the articles undergoing sorting are discharged through a gravity sorting port unless actuated on by a positive control means. This has particular advantage where it is only necessary to separate a few articles from a relatively large number of articles. In this type of sorting, the bulk of the articles leave the sorting chute by the gravity port and only the few that must be separated from the bulk will be discharged from one of the other ports by mechanical positive means such as an air blast. For this purpose, the chute is inclined and contains two or more ports, one of which I designate as a gravity port since all the articles leaving that port leave by gravity alone. The gravity port is located near the lower end of the inclined chute and the port through which the articles are positively discharged by mechanical means located near the upper end of the inclined chute.

I further provide suitable baffles to prevent articles being introduced into the chute from entering any of the upper ports as they are dropped into the chute and this insures that the articles will leave the gravity port unless positively acted upon. I also provide a baffle near the gravity port to prevent articles from being lodged behind the air jet.

Another object and advantage of my invention is in the use in connection with inspection equipment wherein the inspection comprises electronic, photoelectric or mechanical inspection of articles for size, shape, color, defects, etc., in which the gravity port is used to discharge the reject articles and the upper port is used to discharge the accept articles. This has the advantage that any failure of the inspection apparatus which controls the air jet or any failure in the air jet will cause the accept articles to pass along with the reject articles rather than having any of the reject articles being mixed with the good articles. In inspection or testing operations, it is highly important that all the articles entering the accept receptacle be good and by using a chute of this kind, I prevent any bad articles from being mixed with good articles in case of any failure of the component parts of the selecting mechanism or the testing mechanism.

Figure 1:
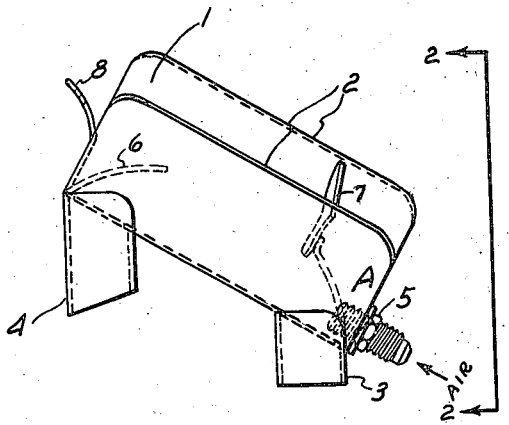
Figure 2:
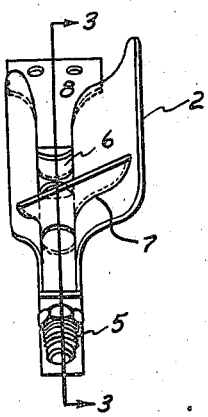
Figure 4:
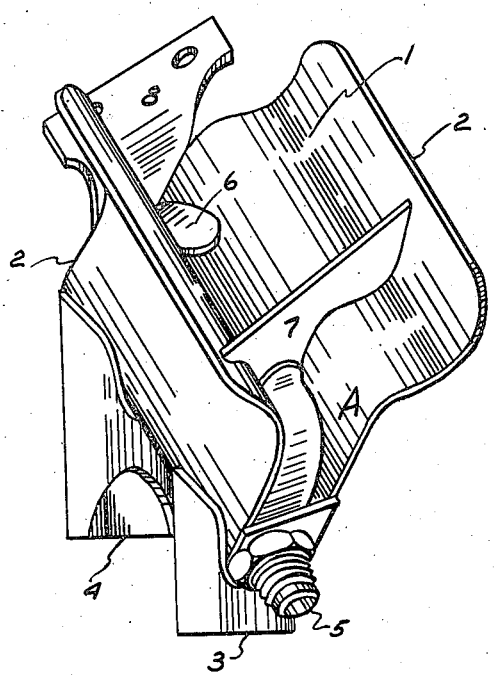
Figure 3:
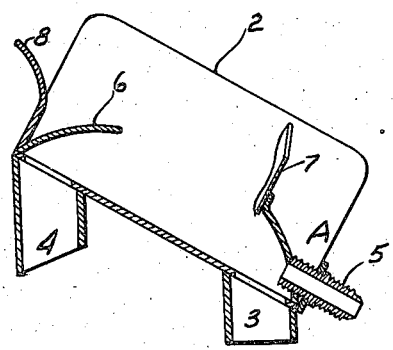

Other objects, advantages, and uses of my sorting chute will become apparent by referring to the drawing wherein Fig. 1 is a side elevation of the inclined sorting chute. Fig. 2 is an end elevation of the chute. Fig. 3 is a cross-section elevation corresponding to Fig. 1 showing in more detail the internal construction. Fig. 4 is a perspective drawing of the entire chute assembly.

Referring to the drawing, although not illustrated, the articles are preferably introduced into the upper end of the chute at 1. The chute is open across the top and comprises the side plates 2. A gravity port 3 is provided near the lower end of the inclined chute. The chute is inclined preferably, although not necessarily, at an angle of about 45° in order to provide a proper flow of the articles downward through the chute in order that they may enter the port 3. An upper port 4 is provided through which articles are discharged only when acted upon by an air jet which enters the chute through the connection 5. In order to prevent articles from leaving port 4 as they are introduced into the chute approximately at point 1, a baffle 6 is provided. To prevent articles from piling up in the chute on top of the connection 5 at point A, the baffle 7 is provided. This insures that articles being forced upwardly through the chute by air jet entering the connection 5 do not strike baffle 6 or the end of the chute and bounce back into the lower end of the chute and pile up at the point A. A plate 8 is provided for attaching the chute fixedly to a support (not illustrated). Although the chute is shown with a lower gravity port and an upper port, additional ports may be provided; and instead of having the air jet enter through the connection 5, additional connections may be provided in the side of the chute to discharge the articles undergoing sorting through other ports depending upon the type of sorting desired, but all these modifications fall within the broad scope of my invention wherein the articles leave a gravity port unless otherwise acted upon by an air jet entering through the connection 5. The air jet may be controlled by hand in case of hand sorting or may be actuated by synchronized controls in inspection equipment or may be particularly controlled by a light sensitive device used in connection with electronic and photoelectric inspection operations.

In operation, the articles enter the chute at approximately point 1 and are discharged by gravity through port 3, unless the operator or the automatic testing or sorting equipment actuates an air valve such as a solenoid valve and causes an air blast to pass through the connection 5, in which case the articles will be blown to the top of the chute, striking baffle 6, and will leave through port 4.

The various modifications described herein and the drawing are illustrative of my invention, but my invention is only limited by the following claims.

I claim as my invention:

1. A sorting chute for articles comprising an inclined trough, at least one sorting port near the upper end of said trough, a baffle adapted and associated with said port to prevent the article fed into the trough between the ports from passing into the upper port, a port near the lower end of the trough through which articles pass by gravity, and means for preventing, when desired, an article from passing through the lower gravity port including means for causing the article to pass through the upper port.

2. A chute for sorting articles according to rejected articles and accepted articles, comprising a chute having an inner port and a lower port in alignment, a baffle for preventing articles from passing through the upper port as they are introduced into the upper end of the chute between said ports, the lower port for sorting the rejected articles by gravity, a controlled high pressure fluid means for preventing the accepted articles from passing through the lower port and for causing them to pass through the upper port.

SAMUEL C. HURLEY, Jr.